United States Patent [19]
Hotta et al.

[11] Patent Number: 5,581,384
[45] Date of Patent: Dec. 3, 1996

[54] PROCESS FOR PRODUCING A DISPLAY DEVICE BY DEFORMING THERMOPLASTIC SPACER PARTICLES

[75] Inventors: Yoshio Hotta; Yukio Hanyu, both of Atsugi; Tadashi Mihara, Isehara; Yasuto Kodera, Fujisawa; Katsutoshi Nakamura, Atsugi, all of Japan

[73] Assignee: Canon Kabushiki Kaisha, Tokyo, Japan

[21] Appl. No.: 476,768

[22] Filed: Jun. 7, 1995

Related U.S. Application Data

[62] Division of Ser. No. 150,984, Nov. 12, 1993, abandoned, which is a division of Ser. No. 8,543, Jan. 25, 1993, Pat. No. 5,285,304.

[30] Foreign Application Priority Data

Jan. 24, 1992 [JP] Japan ................................. 4-032865
Jan. 27, 1992 [JP] Japan ................................. 4-034029

[51] Int. Cl.$^6$ ........................................... G02F 1/1339
[52] U.S. Cl. ................................................... 349/155
[58] Field of Search ........................................ 359/81

[56] References Cited

U.S. PATENT DOCUMENTS

| | | | |
|---|---|---|---|
| 4,367,924 | 1/1983 | Clark et al. ........................ | 359/100 |
| 4,561,726 | 12/1985 | Goodby et al. ..................... | 359/75 |
| 4,685,770 | 8/1987 | Baeger .................................. | 359/81 |
| 4,712,875 | 12/1987 | Tsuboyama et al. ................ | 359/81 |
| 4,712,877 | 12/1987 | Okada et al. ........................ | 359/100 |
| 4,728,176 | 3/1988 | Tsuboyama et al. ................ | 359/100 |
| 4,740,060 | 4/1988 | Komura et al. ...................... | 359/81 |
| 4,775,225 | 10/1988 | Tsuboyama et al. ................ | 359/81 |
| 4,932,758 | 6/1990 | Hanyu et al. ........................ | 359/100 |
| 4,973,138 | 11/1990 | Yamazaki et al. ................... | 359/81 |
| 4,983,023 | 1/1991 | Nakagawa et al. .................. | 359/81 |
| 4,989,955 | 2/1991 | Ito et al. .............................. | 359/81 |
| 5,007,716 | 4/1991 | Hanyu et al. ........................ | 359/87 |
| 5,013,137 | 5/1991 | Tsuboyama et al. ................ | 359/54 |
| 5,054,890 | 10/1991 | Hanyu et al. ........................ | 359/81 |
| 5,087,114 | 2/1992 | Fukui et al. ......................... | 359/81 |
| 5,099,344 | 3/1992 | Tsuboyama et al. ................ | 359/79 |
| 5,103,331 | 4/1992 | Taniguchi et al. .................. | 359/81 |
| 5,109,294 | 4/1992 | Hanyu et al. ........................ | 359/83 |
| 5,165,076 | 11/1992 | Tsuboyama et al. ................ | 359/75 |
| 5,189,536 | 2/1993 | Hanyu et al. ........................ | 359/56 |
| 5,285,304 | 1/1994 | Hotta et al. ......................... | 359/81 |

FOREIGN PATENT DOCUMENTS

| | | | |
|---|---|---|---|
| 57-29031 | 2/1982 | Japan ................................. | 359/81 |
| 084220 | 5/1984 | Japan ................................. | 359/81 |
| 62-8128 | 1/1987 | Japan ................................. | 359/81 |
| 62-73232 | 7/1987 | Japan ................................. | 359/81 |
| 1-113729 | 5/1989 | Japan ................................. | 359/81 |
| 096119 | 4/1990 | Japan ................................. | 359/81 |
| 160416 | 7/1991 | Japan ................................. | 359/81 |

*Primary Examiner*—William L. Sikes
*Assistant Examiner*—James A. Dudek
*Attorney, Agent, or Firm*—Fitzpatrick, Cella, Harper & Scinto

[57] ABSTRACT

There is provided a ferroelectric liquid crystal device wherein the yellowing due to a cell thickness increase or occurrence of voids is suppressed. The ferroelectric liquid crystal device includes a pair of substrates each having thereon a group of electrodes for liquid crystal drive, and a layer of ferroelectric liquid crystal disposed between the substrates, wherein thermosetting adhesive particles and thermoplastic polymer particles having a diameter which is 1.5–5 times the liquid crystal layer thickness are dispersed and pressed between the substrates. The polymer particles preferably have a glass transition temperature of at most −20° C.

1 Claim, 6 Drawing Sheets

PROCESS FOR PRODUCING A DISPLAY DEVICE BY DEFORMING THERMOPLASTIC SPACER PARTICLES

This application is a division of application Ser. No. 08/150,984, filed Nov. 12, 1993 now abandoned, which is a division of application Ser. No. 08/008,543, filed Jan. 25, 1993, now U.S. Pat. No. 5,285,304.

FIELD OF THE INVENTION AND RELATED ART

The present invention relates to a liquid crystal device using a chiral smectic liquid crystal, particularly a ferroelectric liquid crystal device wherein the increase in cell gap and occurrence of void due to movement of liquid crystal molecules during multiplexing drive are suppressed.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

For an optical modulating device by use of a liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation (1):

$$I/I_0 = \sin^2 4\theta \sin^2(\Delta nd/\lambda)\pi \quad (1)$$

wherein
$I_0$: incident light intensity,
I: transmitted light intensity,
θ: tilt angle,
$\Delta n$: refractive index anisotropy,
d: thickness of the liquid crystal layer,
π: wavelength of the incident light.
The tilt angle θ 0 in the above-mentioned non-helical structure is recognized as a half of an angle between the average molecular axis directions of liquid crystal molecules in a twisted alignment in a first orientation state and a second orientation state. According to the above equation, it is shown that a tilt angle θ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step. As an alignment method for a ferroelectric liquid crystal, particularly a chiral smectic liquid crystal in a non-helical structure, one disclosed in U.S. Pat. No. 4,561,726 has been known for example.

According to our study, it has been found that, in a liquid crystal cell containing a ferroelectric liquid crystal, liquid crystal molecules per se are moved in a particular direction within the cell during drive and, as a result, the pressure is increased along a cell side to result in an increase in cell-thickness. Presumably, such a force causing the liquid crystal molecule movement may be attributable to an electrodynamic effect caused by perturbation of liquid crystal molecule dipole moments in an AC-like electric field caused by continuation of drive pulses. Further, according to our experiments, the directions 22a and 22b of the liquid crystal movement are determined in relation with the rubbing direction 20 and the average liquid crystal molecular axis position 21a or 21b as shown in FIG. 1A. As the moving direction of liquid crystal molecules is related with the rubbing direction, the above-mentioned phenomenon is assumed to depend on the pre-tilt state at the substrate surfaces. Referring to FIGS. 1A and 1B, reference numeral 21a (or 21b in a reverse orientation state) denotes an average molecular axis (director) orientation. When the liquid crystal molecules (described herein as having a negative spontaneous polarization) are oriented to provide the average molecular axis 21a and are supplied with a certain strength of AC electric field not causing a switching to the orientation state 21b, the liquid crystal molecules are liable to move in the direction of an arrow 22a in the case where the substrates are provided with rubbing axes extending in parallel and in the same direction 20. This liquid crystal movement phenomenon depends on an alignment state in the cell as described hereinbelow.

The alignment including a chevron structure of smectic layers may be explained on a model of two alignment states C1 and C2 shown in FIG. 2. Referring to FIG. 2, reference numeral 31 denotes a smectic layer showing ferroelectricity, 32 denotes a C1 alignment region, and 33 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates 14a and 14b (chevron structure) as shown in FIG. 2. The bending of the layers 31 can be caused in two ways corresponding to the C1 and C2 alignment as shown. As is well known, liquid crystal molecules at the substrate surfaces are aligned to form a certain angle α (pre-tilt) as a result of rubbing in a direction A in such a manner that their heads (leading ends) in the rubbing direction are up (or away) from the substrate surfaces 11a and 11b. Because of the pre-tilt, the C1 and C2 alignment states are not equivalent to each other with respect to their elastic energy, and a transition between these states can be caused at a certain temperature or when supplied with a mechanical stress. When the layer structure shown in FIG. 2 is viewed in plan as shown in the upper part of FIG. 2, a boundary 34 of transition from C1 alignment (32) to C2 alignment (33) in the rubbing direction A looks like a zigzag lightning and is called a lightning defect, and a boundary 35 of transition from C2 alignment (33) to C1 alignment (32) forms a broad and moderate curve and is called a hairpin defect.

When FLC is disposed between a pair of substrates 14a and 14b and placed in an alignment state satisfying a relationship of $ⓗ<α+δ$ ... (2), wherein α denotes a pretilt angle of the FLC, $ⓗ$ denotes a tilt angle (a half of cone angle), and δ denotes an angle of inclination of SmC* layer, there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $θ_a$ therebetween in the absence of an electric field satisfying a relationship of $ⓗ>θ_aⓗ/2$ ... (3) are inclusively referred to as a uniform state.

In the uniform state, the directors are believed to be not twisted between the substrates in view of optical properties thereof. FIG. 3A is a schematic view illustrating director positions between the substrates in the respective states in C1 alignment. More specifically, at 51–54 are respectively shown changes in director positions between the substrates in the form of projections of directors onto cone bottoms as viewed from each bottom. At 51 and 52 is shown a splay state, and at 53 and 54 is shown a director arrangement which is believed to represent a uniform alignment state. As is understood from FIG. 3A, at 53 and 54 representing a uniform state, the molecule position (director) is different from that in the splay state either at the upper substrate or lower substrate. FIG. 3B shows two states in C2 alignment between which no switching is observed at the boundaries but an internal switching is observed. The uniform state in C1 alignment provides a larger tilt angle $θ_a$ and thus a higher brightness and a higher contrast than the conventionally used bistable state in C2 alignment.

However, in a ferroelectric liquid crystal having a uniform alignment state based on the condition of $ⓗ>θa>ⓗ/2$, problem is liable to occur as described below in connection with the above-mentioned liquid crystal movement.

In an actual liquid crystal cell, the liquid crystal movement occurs as shown in FIG. 1A. For example, when the liquid crystal molecules in the entire cell are placed in a state providing an average molecular axis direction 21a, the liquid crystal molecules in the cell are liable to move under AC application in the direction of the arrow 22, i.e., from the right to the left in the figure. As a result, the cell thickness in a region 23 is increased gradually to show a yellowish tint. If the liquid crystal molecules are placed in a state providing an average molecular axis 21b, the liquid crystal movement under AC application is caused in the reverse direction 22b. In either case, the liquid crystal movement is caused in a direction perpendicular to the rubbing direction, i.e., in the direction of extension of smectic layers.

According to another experiment of ours, when a ferroelectric liquid crystal cell 60 including a ferroelectric liquid crystal of a non-helical structure in a high pretilt alignment state in a cell region defined by a sealant 69 is driven by a driver including a scanning electrode driver circuit 62 and a data electrode driver circuit 64 to continuously write in a white (61) or black (63) fixed pattern as shown in FIG. 4, liquid crystal molecules are caused to move in different directions B and C in parallel with the extension direction of chiral smectic C layers and perpendicular to the rubbing direction A corresponding to the molecular positions for displaying a white display state (region 61) and a black display state (region 63), respectively. As a result, at the destination sides of the liquid crystal molecular movement, the liquid crystal layer is caused to have an increased thickness while enlarging the cell gap to form portions 65 colored in pale yellow (yellowing). On the opposite sides of the liquid crystal molecular movement, voids 67 lacking liquid crystal molecules are formed. These phenomena are caused most noticeably in the neighborhood of the seal 69 and propagated toward the inside of the cell.

As described above, we have found that the liquid crystal movement in one direction is caused in a long term of drive to cause a slight change in cell thickness, thus resulting in yellowing or color deviation adversely affecting the display characteristics.

More specifically, in the destination side in the liquid crystal movement direction, the cell thickness is liable to be increased to result in a yellowish tint. On the opposite side, a state with a less amount of liquid crystal results to cause a disorder in alignment. Accordingly, a liquid crystal device causing these phenomena as a result of long term drive shows a uniformity in display performance which is much worse than the initial state, thus being accompanied with a problem in reliability.

The above-mentioned change in cell thickness causes further difficulties including changes in drive voltage threshold characteristics and adverse effects to durability of the liquid crystal device in a long term of continuous drive.

SUMMARY OF THE INVENTION

In view of the above-mentioned problems, an object of the present invention is to prevent or effectively suppress the above-mentioned yellowing or occurrence of voids due to a cell thickness increase in a ferroelectric liquid crystal device by suppressing the above-mentioned liquid crystal movement.

Another object of the present invention is to provide a ferroelectric liquid crystal device wherein the lowering or deterioration in image quality or lowering in image display quality due to the above-mentioned yellowing or occurrence of voids can be prevented or effectively suppressed.

A further object of the present invention is to provide at a low cost a ferroelectric liquid crystal device which is excellent in durability and capable of displaying high-quality images for a long period.

According to the present invention, there is provided a ferroelectric liquid crystal device, comprising: a pair of substrates each having thereon a group of electrodes for liquid crystal drive, and a layer of ferroelectric liquid crystal disposed between the substrates, wherein thermosetting adhesive particles and thermoplastic polymer particles respectively having a diameter which is 1.5–5 times the liquid crystal layer thickness are dispersed and pressed between the substrates.

According to another aspect of the present invention, there is provided a ferroelectric liquid crystal device, comprising: a pair of substrates each having thereon a group of electrodes for liquid crystal drive, and a layer of ferroelectric liquid crystal disposed between the substrates, wherein thermosetting adhesive particles and thermoplastic polymer particles having a glass transition temperature of at most −20° C. are dispersed and pressed between the substrates.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
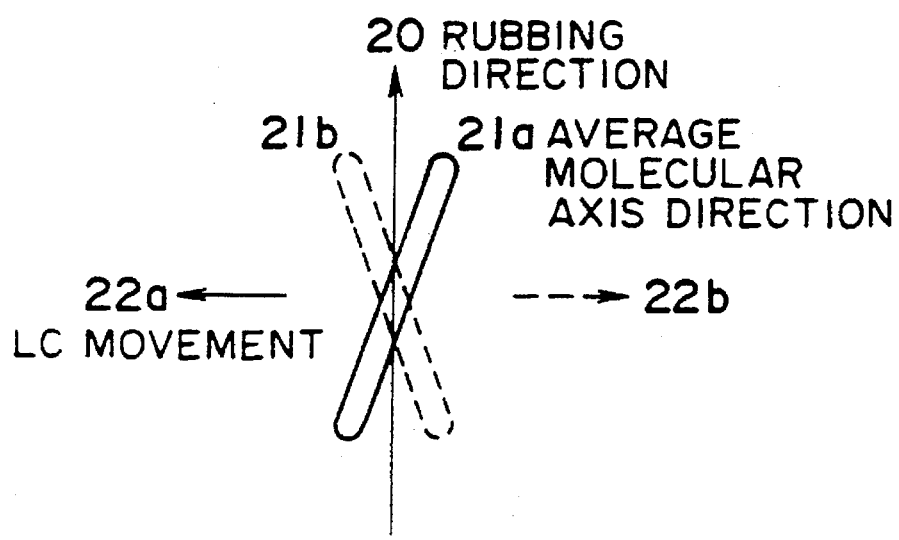
FIGS. 1A and 1B are explanatory views for illustrating a cell thickness increase along a cell side in relation with liquid crystal movement directions.
Figure 1B:
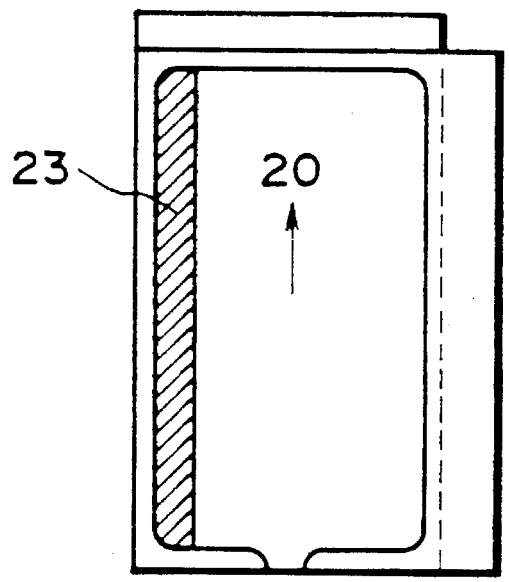
Figure 2:
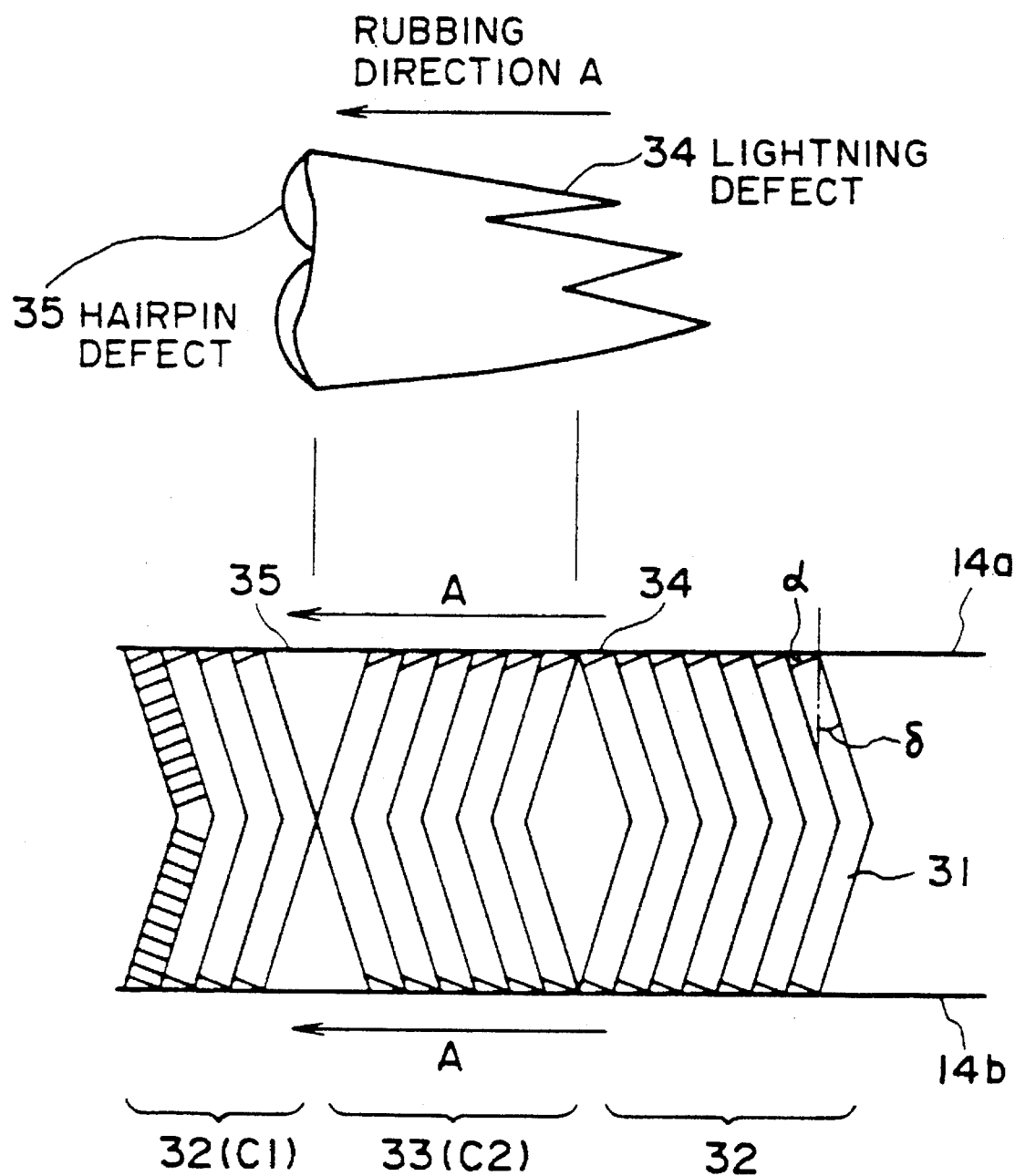
FIG. 2 is an explanatory view for illustrating an alignment state occurring in a chiral smectic liquid crystal used in the invention.
Figure 3B:
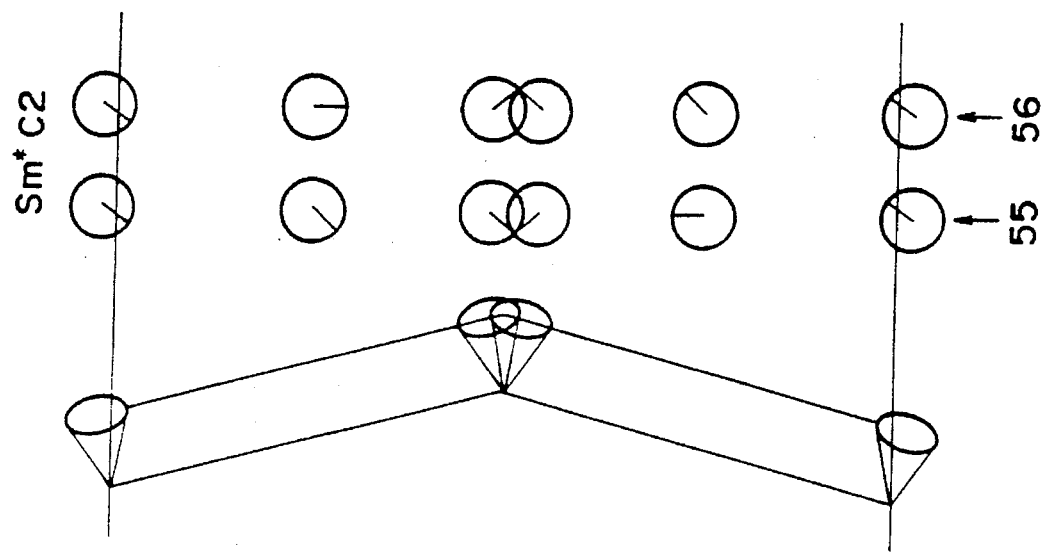
FIGS. 3A and 3B are explanatory views for illustrating changes in director orientation according to various positions between substrates in C1 alignment and C2 alignment, respectively.
Figure 3A:
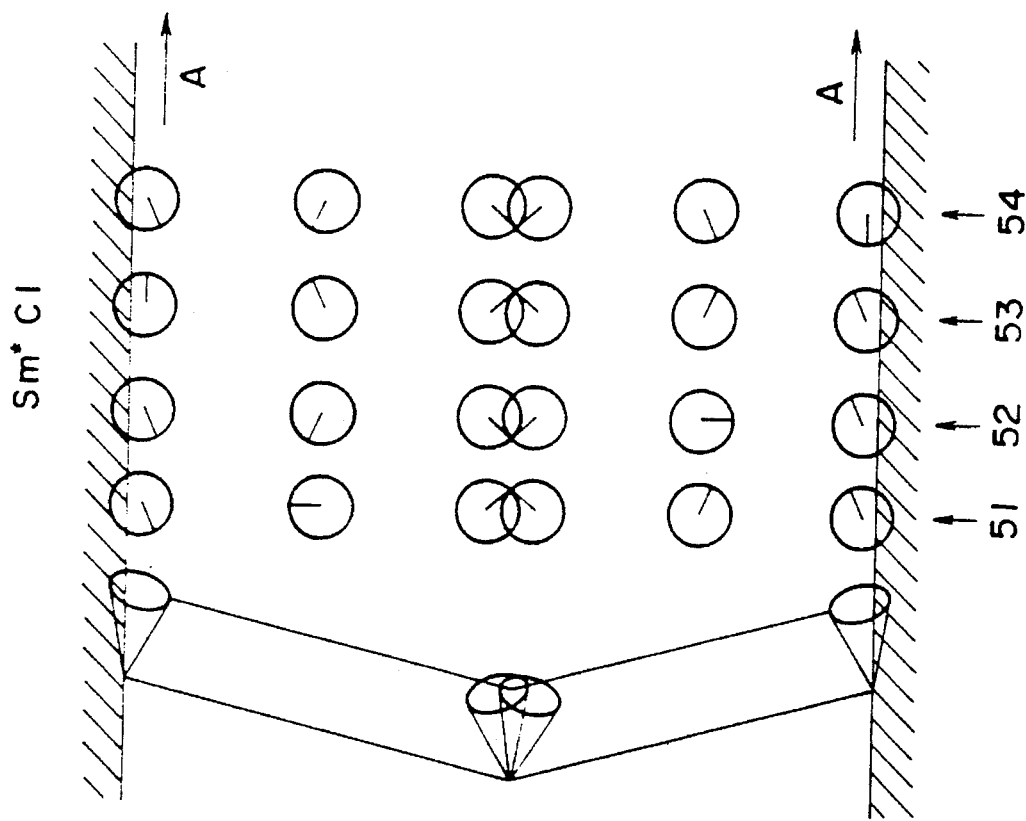
Figure 4:
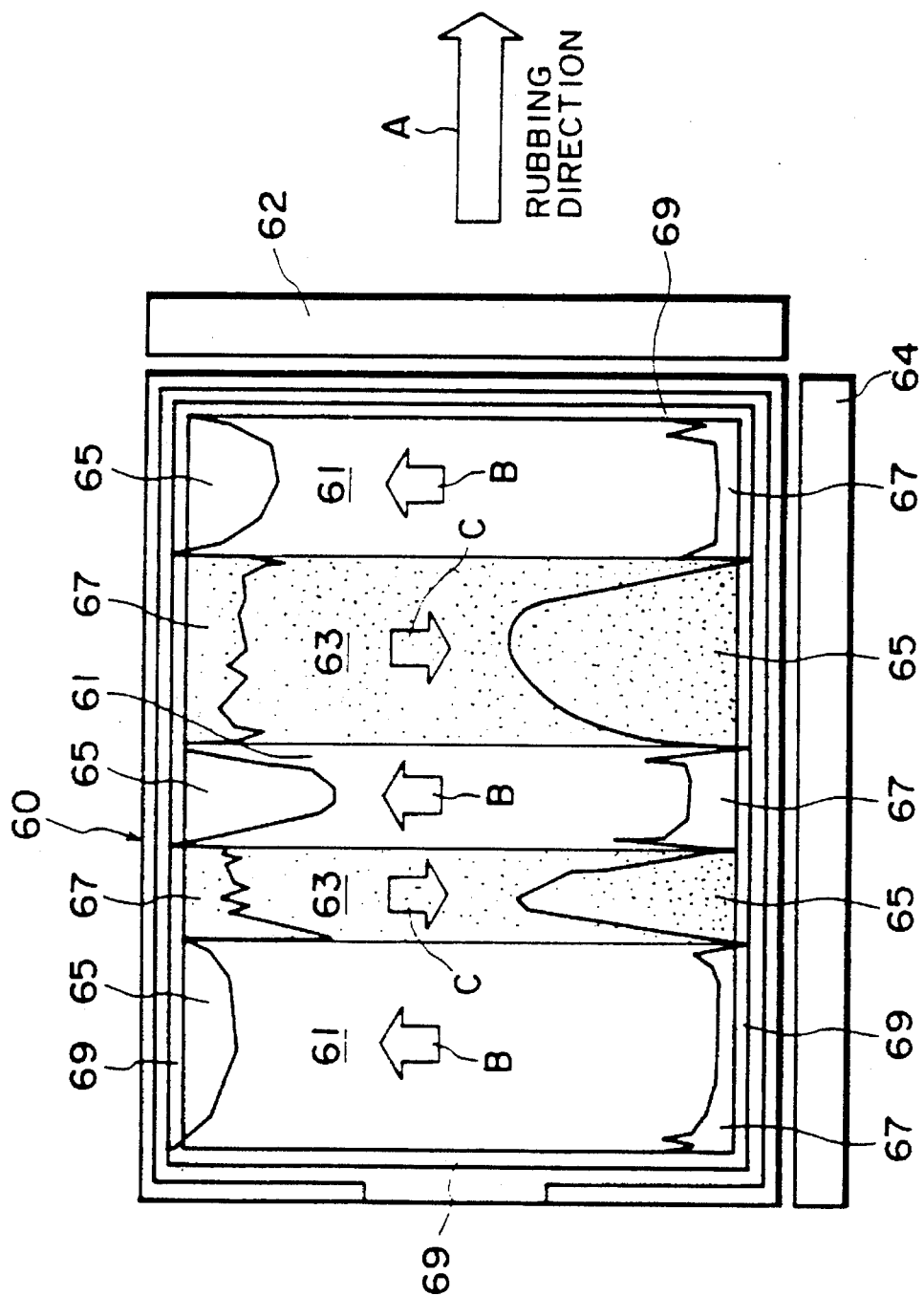
FIG. 4 is a front view of a conventional liquid crystal display apparatus when it is driven for a long time for displaying a fixed pattern.

In the liquid crystal device according to the present invention, thermosetting adhesive polymer particles and thermoplastic non-adhesive polymer particles are disposed in a pressed state between a pair of substrates sandwiching the liquid crystal material. The thermosetting adhesive particles and thermoplastic polymer particles before incorporated in the device or application of an external force thereto may suitably have an average diameter which is 1.5–5 times the cell gap, i.e., the thickness of the liquid crystal layer within the device.

The minimum diameter of the polymer particles of 1.5 times the cell is determined because it is a minimum condition for retaining a desired columnar shape between the substrates. On the other hand, the maximum diameter of 5 times the cell gap has been determined so as to minimize an adverse effect to the alignment from experimental study.

As in a conventional device thermosetting adhesive particles are dispersed to suppress a shearing force to provide an improved impact-resistance between a pair of substrates. However, there is a certain limit for the dispersion density of the thermosetting adhesive particles due to occurrence of vacuum voids in the liquid crystal layer. In the present invention, the above difficulty is alleviated by dispersion of thermoplastic polymer particles in addition. As the polymer particles comprise a thermoplastic resin, there is obtained an unexpected benefit that the deterioration of display performances can be suppressed because of an appropriate resilience of the polymer particles even when the liquid crystal device is exposed to a low temperature.

The polymer particles are pressed and enlarged in area when they are disposed between the substrates within the liquid crystal device so that they effectively suppress the liquid crystal movement.

More specifically, the thermoplastic polymer particles having a diameter of 1.5–5 times the cell, when dispersed and pressed within the liquid crystal cell containing a ferroelectric liquid crystal, form columns between the substrates, which function as an obstacle to remarkably suppress the movement of liquid crystal molecules in a ferroelectric liquid crystal layer of, e.g., smectic C phase. If a polymer particles forms a column of several μm in diameter, this corresponds to several thousands of layers wherein the liquid crystal molecular movement is hindered in view of the fact that each layer spacing for liquid crystal movement is several tens of angstromes. When a movement of a liquid crystal molecule within a layer is suppressed, the molecule cannot but change moving torque into a direction crossing the layers, but the movement across the layers requires a larger torque by almost one digit. As a result, because of the presence of the obstacle (column), the velocity of the liquid crystals moving along a layer which is traversed by the column is lowered by nearly one digit. Accordingly, the movement of liquid crystal molecules along the liquid crystal molecular layer is suppressed.

When the adaptability of a ferroelectric liquid crystal panel to storage at a lower temperature is considered, in case where rigid columnar structures are present within the panel, the columnar structures under a volumetric shrinkage between the substrates upon cooling and on the other hand the liquid crystal contained therein causes a shrinkage regardless of the columnar structures. As a result, there can be formed voids within the cell in some cases because the cell shrinkage fails to follow the liquid crystal shrinkage.

In order to cope with the problem, in the present invention, the columnar structures may preferably be provided with a resilience or softness by using non-adhesive thermoplastic polymer particles in addition to the adhesive particles used for providing an increased impact resistance. In order to provide a better low-temperature storability, the polymer particles may preferably comprise a thermoplastic polymer having a glass transition temperature Tg of at most −20° C. On the other hand, the polymer particles are required to be dispersed within the substrates and accordingly required to have an appropriate dispersibility. The low glass transition temperature characteristic is generally contradictory with the dispersibility. The contradiction can be removed by micro-encapsulating polymer particles having such a low glass transition temperature.

Hereinbelow, some embodiments of the present invention will be described with reference to drawings.

Figure 5:
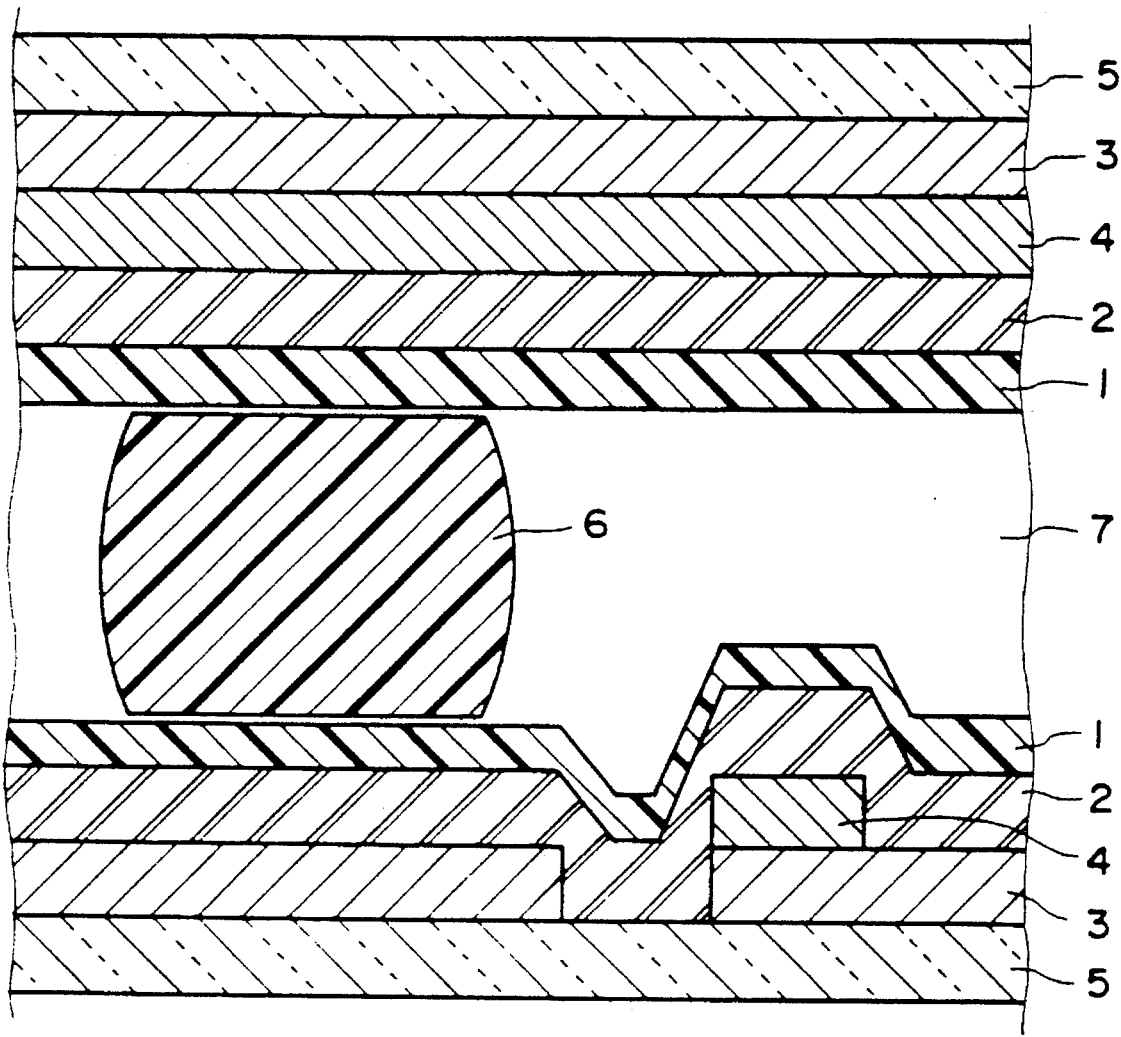
FIG. 5 is a schematic sectional view of an embodiment of the liquid crystal cell according to the invention.

FIG. 5 is a partial schematic sectional view of a liquid crystal cell according to a suitable embodiment of the present invention. Referring to FIG. 5, the liquid crystal cell includes a pair of oppositely disposed glass substrates 5 respectively having on their inside surfaces ITO stripe electrodes 3 extending in mutually crossing directions, metal electrodes or wires 4 disposed on the ITO electrodes 3, insulating layers 2 and alignment films 1 further disposed inside, polymer particles 6 dispersed and pressed in adhesion between the alignment films 1, and a ferroelectric smectic liquid crystal 7 placed in a non-helical structure providing at least two stable states and filling the gap between the alignment films 1. In FIG. 5, the thermosetting adhesive particles are omitted from showing.

The polymer particles 6 used in the present invention may suitably comprise a resilient material not reactive with the liquid crystal material used. Examples of such material may include: resins, such as high-density or low-density polyethylene, acrylic urethane, nylon, acrylic resin containing a rubber, such as butyl rubber, added thereto, and silicone rubber. These materials are not exhaustive and can also be used in combination of plural species.

The thermosetting adhesive particles may preferably be dispersed at a rate of at least 40 particles/mm$^2$ more preferably at least 80 particles/mm$^2$ in order to provide a required impact resistance and generally at most 160 particles/mm$^2$ so as to avoid occurrence of vacuum voids. On the other hand, the thermoplastic non-adhesive polymer particles may preferably be dispersed at a rate of at least 40 particles, more preferably at least 80 particles/mm$^2$ and at most 140 particles/mm$^2$ so as not to cause deterioration in image quality. Accordingly, the polymer particles may preferably be dispersed at least 80 particles/mm$^2$ more preferably at least 160 particles/mm$^2$ and at most 300 particles/mm$^2$ in total.

EXAMPLE 1

In order to form a columnar structure of polymer particles 6, nylon resin particles ("SP-500M", mfd. by Toray K. K.)

having an average diameter of 5 μm which was about 4 times a pre-set cell gap of 1.2 μm were suspended in IPA (isopropyl alcohol) solution and, after sufficient dispersion, the resultant dispersion was sprayed with nitrogen gas through a spray nozzle to be dispersed on an alignment film 1 of a substrate. Further, thermosetting adhesive particles of a similar diameter were dispersed at a rate of 80 particles/mm$^2$ as usual. Then, through an ordinary cell preparation process including application of another substrate with a sealant and curing of the sealant, a liquid crystal cell having a structure as shown in FIG. 5 was prepared. In the sealant curing step, the polymer particles were melted and pressed between the substrates to form a columnar structure as illustrated.

EXAMPLE 2

Several cells were prepared in the same manner as in Example 1 except that the dispersion rate of the thermosetting adhesive particles was fixed at 80 particles/mm$^2$ and the dispersion rate of the polymer particles were changed in various ways.

The resultant cells were subjected to 100 hours of drive test under application of rectangular pulses of Vop=20 volts at 30° C., and the resultant maximum cell increase for each cell was measured. The results are shown in FIG. 6.

Figure 6:
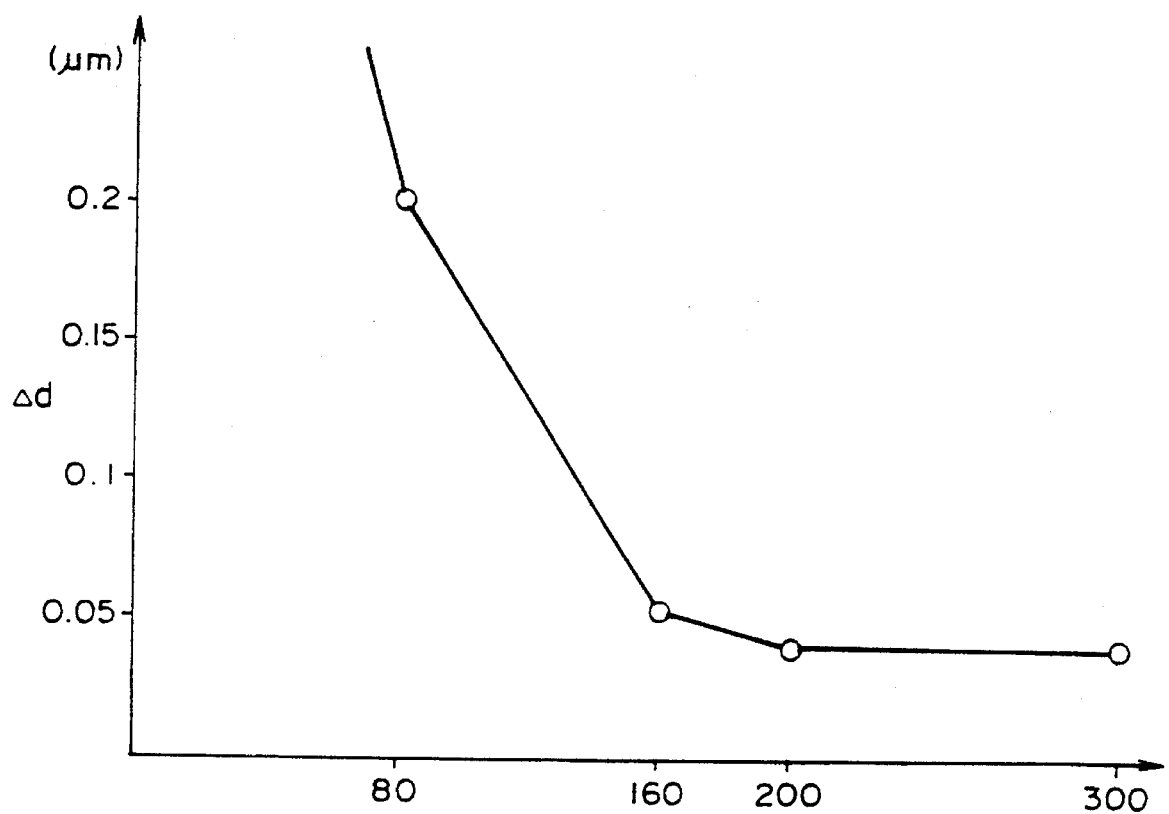
FIG. 6 is a graph showing a change in cell thickness increase depending on the density of dispersed adhesive particles and polymer particles.

As is shown in FIG. 6, the cell thickness change increase Δd was decreased up to a total dispersion density of 200 particles/mm$^2$ and at a higher dispersion density the cell thickness change was not substantially decreased any further.

EXAMPLE 3

Encapsulated polymer particles were prepared by microencapsulating particles of acrylic methane resin having an average diameter of 5 μm which was about 4 times a set cell gap of 1.2 μm with PMMA (polymethyl methacrylate). Then, the encapsulated polymer particles were suspended and well dispersed in IPA solution and the resultant dispersion was sprayed with nitrogen gas through a spray nozzle to be dispersed at a rate of 80–140 particles/mm$^2$ on an alignment film 1 of a substrate. Further, thermosetting adhesive particles were dispersed at a rate of 80 particles/mm$^2$ as usual.

Then, through an ordinary cell application process, a liquid crystal cell (panel) having a sectional structure as shown in FIG. 5 was prepared. During the cell preparation, the encapsulated polymer particles were pressed between the substrates to rupture the capsules and exposed the soft polymer particles therein in the step of sealant curing under pressure.

Then, the liquid crystal panel thus prepared was stored at a low temperature of −20° C. As a result, occurrence of voids within the panel was not observed even after lapse of 240 hours. In contrast thereto, a liquid crystal panel prepared in a similar manner except for using polymer particles having a higher glass transition temperature (i.e., in the same manner as in Example 1) caused voids therein in 12 hours.

The above results show that the use of encapsulated polymer particles having a low glass transition point for dispersion within a cell could prevent occurrence of voids during low-temperature storage while preventing the occurrence of yellowing or voids during operation.

EXAMPLE 4

Several cells were prepared in the same manner as in Example 3 except that the dispersion rate of the thermosetting adhesive particles were fixed at 80 particles/mm$^2$ and the dispersion rate of the polymer particles were changed in various ways.

The resultant cells were subjected to 100 hours of drive test under application of rectangular pulses of Vop=20 volts at 30° C., and the resultant maximum cell thickness increase for each cell was measured in the same manner as in Example 2.

Similarly as in Example 2, the cell thickness change Δd was decreased up to a total dispersion density of 200 particles/mm$^2$ and at a high dispersion density the cell thickness change was not substantially decreased any further.

EXAMPLE 5

Three liquid crystal cells were prepared in the same manner as in Example 3 except that the polymer particles of acrylic resin containing 35% of butyl rubber, silicone rubber resin (mfd. by Toray Silicone K. K.) and low-density polyethylene resin (mfd. by Sumitomo Seika K. K.), respectively, were used.

Then, the liquid crystal cells were subjected to a similar low-temperature storage test at −240° C. as in Example 3. In any case, no abnormality was observed even after 240 hours of the storage. In contrast thereto, a liquid crystal cell prepared in the same manner except for the use of polymer particles having a glass transition temperature exceeding −20° C. caused voids after 12–24 hours of the storage.

As described above, according to the present invention, it is possible to remarkably suppress the occurrence of yellowing or voids due to movement of liquid crystal molecules even after a long time of drive by dispersing thermoplastic polymer particles having a diameter 1.5–5 times the liquid crystal layer thickness between the substrates in a pressed state in addition to thermosetting adhesive particles.

Further, by using thermoplastic polymer particles having a glass transition temperature of at most −20° C., it is possible to provide an improved low-temperature storability while retaining the effect of suppressing the yellowing or occurrence of voids.

Further, by using such polymer particles in an encapsulated form, it is possible to improve the dispersibility of the polymer particles whereby it is possible to enhance the effect of suppressing liquid crystal movement and further improve the display quality.

What is claimed is:

1. A process for producing a liquid crystal device comprising, in this order, the steps of:

dispersing resilient thermoplastic polymer particles at a density of at least 80 particles/mm$^2$ on at least one of a pair of substrates, said polymer particles having a diameter (d) and a glass transition point of at most −20° C., superposing the pair of substrates opposite to each other so as to sandwich the thermoplastic polymer particles under application of heat and pressure to deform the thermoplastic polymer particles into a columnar shape and attain a prescribed gap (g) between the substrates, wherein said prescribed gap (g) and said particle diameter (d) satisfy the relationship d/5.0<g<d/1.5; and filling the gap between the substrates with a chiral smectic liquid crystal.

* * * * *

UNITED STATES PATENT AND TRADEMARK OFFICE
CERTIFICATE OF CORRECTION

PATENT NO. : 5,581,384

DATED : December 3, 1996

INVENTOR(S) : YOSHIO HOTTA, ET AL.    Page 1 of 2

It is certified that error appears in the above-identified patent and that said Letters Patent is hereby corrected as shown below:

COLUMN 1

Line 23, "of" should read --or--.
    Line 54, "0" should be deleted.

COLUMN 3

Line 11, "$(H) > \theta_a (H)/2 \ldots (3)$" should
             read --$(H) > \theta_a > (H)/2 \ldots (3)$--.
    Line 34, "problem" should read --a problem--.

COLUMN 5

Line 57, "a" should be deleted.
    Line 58, "forms" should read --form--.
    Line 62, "angstromes." should read --angstroms.--.

COLUMN 6

Line 29, "drawings." should read --the drawings.--.
    Line 52, "40 particles/mm$^2$" should
             read --40 particles/mm$^2$,--.
    Line 58, "particles," should read --particles/mm$^2$,--.
    Line 59, "hot" should read --not--.
    Line 61, "80 particles/mm$^2$" should
             read --80 particles/mm$^2$,--.

UNITED STATES PATENT AND TRADEMARK OFFICE
CERTIFICATE OF CORRECTION

PATENT NO. : 5,581,384
DATED : December 3, 1996
INVENTOR(S) : YOSHIO HOTTA, ET AL.

It is certified that error appears in the above-identified patent and that said Letters Patent is hereby corrected as shown below:

COLUMN 7

Line 46, "exposed" should read --expose--.

Signed and Sealed this

Twenty-ninth Day of April, 1997

Attest:

BRUCE LEHMAN

Attesting Officer

Commissioner of Patents and Trademarks